July 9, 1963

T. R. WILLIAMSON 3,096,608

SAFETY BLADE ASSEMBLY FOR ROTARY MOWERS

Filed June 15, 1962

INVENTOR.
TOM R. WILLIAMSON,
BY
McMorrow, Berman + Davidson
ATTORNEYS.

United States Patent Office 3,096,608
Patented July 9, 1963

3,096,608
SAFETY BLADE ASSEMBLY FOR ROTARY MOWERS
Tom R. Williamson, 813 W. Bolt St., Fort Worth, Tex.
Filed June 15, 1962, Ser. No. 202,875
2 Claims. (Cl. 56—295)

This invention relates to a novel safety blade assembly for rotary mowers.

The primary object of the invention is the provision of a simple, low-cost, and highly efficient device of the kind indicated, which comprises a diametrical cutter blade which is surrounded by a circular guard ring which is fixed to the ends of the blade, whereby the blade is prevented from throwing rocks and other debris to the injury of the operator of a mower or to bystanders, and injurious contact of hands or feet with the blade is prevented.

Another object of the invention is the provision of a device of the character indicated above wherein the cutter blade is in a plane spaced above the guard ring and is connected to the guard ring by declining portions, on the ends of the blade, which are edged, and which serve to release and throw-off grass otherwise accumulating at the ends of the blade.

Other important objects and advantageous features of the invention will be apparent from the following description and the accompanying drawings, wherein, for purposes of illustration only, a specific form of the invention is set forth in detail.

Figure 1:
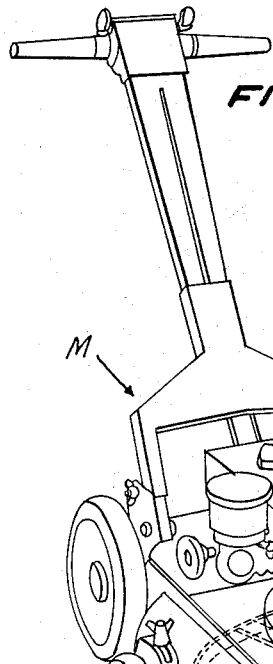
FIGURE 1 is a schematic perspective view, partly broken away and in section, showing a safety blade assembly of the present invention installed on a rotary power mower.
Figure 2:
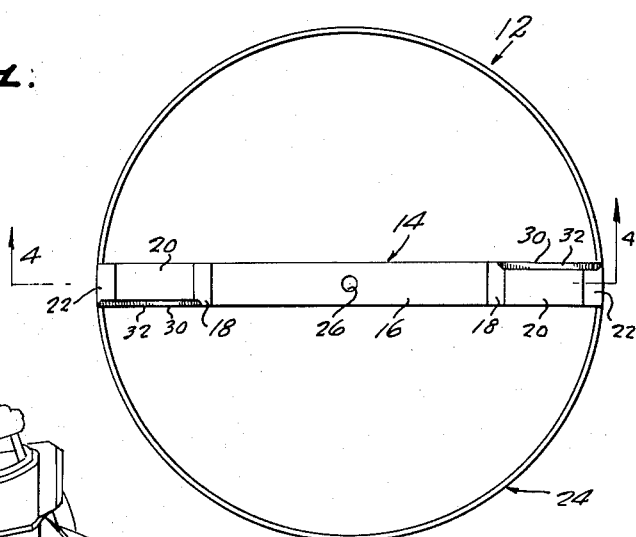
FIGURE 2 is an enlarged top plan view of the blade assembly.
Figure 3:
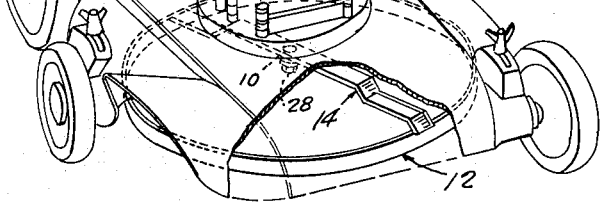
FIGURE 3 is an enlarged side or edge elevation thereof.
Figure 4:
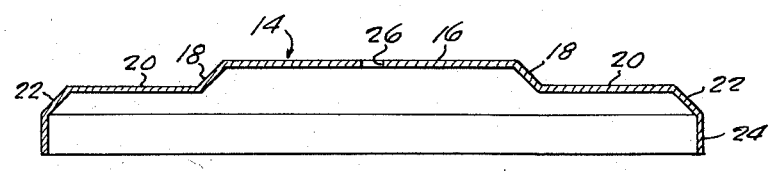
FIGURE 4 is an enlarged vertical transverse section taken on the line 4—4 of FIGURE 1.

Referring in detail to the drawings, wherein like numerals designate like parts throughout the several views, a conventional form of rotary power mower M is shown, which has a pendant vertical motor shaft 10, to which is fixed, in suitable manner, a safety blade assembly 12 in accordance with the present invention.

The illustrated blade assembly comprises a straight diametrical blade 14 having a flat central portion 16, having radially outwardly declining end portions 18 which merge into the inward ends of flat outer end portions 20 which are in parallel spaced relationship to the central portion 16. The portions 16 and 20 are in horizontal planes. The outer end portions 20 terminate, at their outward ends, in radially outwardly declining flat terminals 22, which are suitably fixed, at their outward or lower ends, to the upper edge of a circular guard ring 24, comprising a flat band whose wall is vertical. The central portion 16 of the blade 14 is provided with suitable means for fixing the assembly 12 to the mower motor shaft 10, herein shown as being a hole 26 through which the shaft 10 is adapted to extend, with nuts 28 on the shaft engaged with the blade 14.

The leading edges 30 of the outer end portions 20 of the blade 14, and the leading edges of the terminals 22, are provided with continuous downwardly beveled cutting edges 32.

The spacing of the guard ring 24 below the blade 14 puts the guard ring closer to the ground than the blade, so that stones and other heavy debris, thrown by the blade 14, will strike the guard ring and be prevented from escaping at high speed from the mower M, it being understood that such thrown objects usually have a downwardly and outwardly angled trajectory, as they leave a diametrical cutter blade.

The parts of the cutting edges 32 on the terminals 22 act to cut, loosen, and throw off any grass which might otherwise accumulate on the end portions 20 of the blade 14.

While there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A safety blade assembly for rotary mowers, comprising a diametrical cutter blade, and a circular guard ring surrounding the blade and fixed to the ends of the blade, said blade having a central portion spaced above the guard ring and having centered means for fixing the blade to the motor shaft of a rotary mower, outer end portions spaced below and parallel with the central portion and above the guard ring, the leading edges of said outer end portions being formed with cutting edges, said central portion and said outer end portions being flat and disposed in horizontal planes, and outwardly declining portions on the outward ends of the central portion extending downwardly to and fixed to the inward ends of the outer end portions, said outer end portions terminating at their outward ends in downwardly and outwardly declining terminals fixed at their lower ends to the guard ring.

2. A safety blade assembly for rotary mowers, comprising a diametrical cutter blade, and a circular guard ring surrounding the blade and fixed to the ends of the blade, said blade having a central portion spaced above the guard ring and having centered means for fixing the blade to the motor shaft of a rotary mower, outer end portions spaced below and parallel with the central portion and above the guard ring, the leading edges of said outer end portions being formed with cutting edges, said central portion and said outer end portions being flat and disposed in horizontal planes, and outwardly declining portions on the outward ends of the central portion extending downwardly to and fixed to the inward ends of the outer end portions, said outer end portions terminating at their outward ends in downwardly and outwardly declining terminals fixed at their lower ends to the guard ring, said guard ring comprising a flat band whose wall is vertically disposed, the terminals being fixed to the upper edge of the band.

References Cited in the file of this patent
UNITED STATES PATENTS

| | | |
|---|---|---|
| 1,336,257 | Muzzy | Apr. 6, 1920 |
| 1,394,162 | Gebhardt | Oct. 18, 1921 |
| 2,482,523 | Urschel et al. | Sept. 20, 1949 |
| 2,621,568 | Fletcher | Dec. 16, 1952 |
| 2,887,838 | Gudmundsen | May 26, 1959 |
| 3,059,400 | Plummer | Oct. 23, 1962 |